(12) United States Patent
Meyer

(10) Patent No.: US 7,739,436 B2
(45) Date of Patent: Jun. 15, 2010

(54) METHOD AND APPARATUS FOR ROUND ROBIN RESOURCE ARBITRATION WITH A FAST REQUEST TO GRANT RESPONSE

(75) Inventor: Michael J. Meyer, Palo Alto, CA (US)

(73) Assignee: Sonics, Inc., Milpitas, CA (US)

( * ) Notice: Subject to any disclaimer, the term of this patent is extended or adjusted under 35 U.S.C. 154(b) by 459 days.

(21) Appl. No.: 10/979,340

(22) Filed: Nov. 1, 2004

(65) Prior Publication Data

US 2006/0095634 A1      May 4, 2006

(51) Int. Cl.
*G06F 13/00* (2006.01)
(52) U.S. Cl. ..................................... 710/111
(58) Field of Classification Search ................ 710/240, 710/241, 113, 111; 370/392
See application file for complete search history.

(56) References Cited

U.S. PATENT DOCUMENTS

| | | | | |
|---|---|---|---|---|
| 5,058,041 A | * | 10/1991 | Rose et al. ................. | 345/535 |
| 5,168,570 A | * | 12/1992 | Eckert et al. ............... | 710/241 |
| 5,274,783 A | | 12/1993 | House et al. | |
| 5,301,333 A | | 4/1994 | Lee | |
| 5,388,245 A | | 2/1995 | Wong | |
| 5,481,680 A | * | 1/1996 | Larson et al. ............... | 710/112 |
| 5,519,837 A | | 5/1996 | Tran | |
| 5,627,976 A | * | 5/1997 | McFarland et al. .......... | 710/309 |
| 5,694,121 A | * | 12/1997 | Krause et al. ................ | 710/40 |
| 5,754,800 A | | 5/1998 | Lentz et al. | |
| 5,784,648 A | | 7/1998 | Duckwall | |
| 5,802,289 A | | 9/1998 | Oprescu | |
| 5,832,278 A | | 11/1998 | Pham | |
| 5,845,097 A | | 12/1998 | Kang et al. | |
| 5,852,630 A | * | 12/1998 | Langberg et al. ............ | 375/219 |
| 5,933,610 A | | 8/1999 | Chambers et al. | |
| 5,948,089 A | | 9/1999 | Wingard et al. | |

(Continued)

FOREIGN PATENT DOCUMENTS

EP        0374 521        6/1990

(Continued)

OTHER PUBLICATIONS

Goossens, Kees, et al., "Guaranteeing the Quality of Services in Networks on Chip," Philips Research Laboratories, Eindhoven, The Netherlands Technical University of Eindhoven, Eindhoven, The Netherlands, In Axel Jantsch and Hannu Tenhunen, editors, Networks on Chip, Kluwer, Chapter 4, Mar. 2003, pp. 61-82.

(Continued)

*Primary Examiner*—Thomas Lee
*Assistant Examiner*—Mohammed H Rehman
(74) *Attorney, Agent, or Firm*—Rutan & Tucker LLP

(57) ABSTRACT

Various methods and apparatuses are described for an arbitration unit that implements a round robin policy. Each requesting device has an equal chance of accessing a shared resource based upon a current request priority assigned to that requesting device. The arbitration unit includes at least a state block that includes a plurality of state registers. The plurality at least includes a first state register for a first unordered pair of requesting devices, a second state register for a second unordered pair of requesting devices, and a third state register for a third unordered pair of requesting devices.

15 Claims, 9 Drawing Sheets

U.S. PATENT DOCUMENTS

| | | | |
|---|---|---|---|
| 5,949,789 A | 9/1999 | Davis et al. | |
| 6,012,116 A | 1/2000 | Aybay et al. | |
| 6,021,450 A | 2/2000 | Yoshizawa et al. | |
| 6,029,219 A | 2/2000 | Michizono et al. | |
| 6,092,158 A | 7/2000 | Harriman et al. | |
| 6,141,713 A | 10/2000 | Kang | |
| 6,145,040 A | 11/2000 | LeaBerge et al. | |
| 6,175,886 B1 | 1/2001 | Usami | |
| 6,182,183 B1 | 1/2001 | Wingard et al. | |
| 6,185,221 B1 * | 2/2001 | Aybay | 370/412 |
| 6,330,225 B1 | 12/2001 | Weber et al. | |
| 6,411,628 B1 | 6/2002 | Hauck et al. | |
| 6,487,213 B1 | 11/2002 | Chao | |
| 6,493,776 B1 | 12/2002 | Courtright et al. | |
| 6,532,509 B1 | 3/2003 | Wolrich et al. | |
| 6,556,571 B1 | 4/2003 | Shahrier et al. | |
| 6,578,117 B2 | 6/2003 | Weber | |
| 6,606,692 B2 * | 8/2003 | Hill et al. | 711/158 |
| 6,704,847 B1 * | 3/2004 | Six et al. | 711/151 |
| 6,725,313 B1 | 4/2004 | Wingard et al. | |
| 6,738,839 B2 | 5/2004 | Sinha | |
| 6,763,415 B1 | 7/2004 | Tischler | |
| 6,765,923 B1 | 7/2004 | LaFollette et al. | |
| 6,782,441 B1 | 8/2004 | Nguyen et al. | |
| 6,785,753 B2 | 8/2004 | Weber et al. | |
| 6,785,758 B1 * | 8/2004 | Kotlowski et al. | 710/305 |
| 6,823,411 B2 | 11/2004 | Hoffmann et al. | |
| 6,826,643 B2 | 11/2004 | Quan et al. | |
| 6,848,017 B2 | 1/2005 | MacEachern et al. | |
| 6,865,632 B1 | 3/2005 | Johas Teener | |
| 6,877,053 B2 * | 4/2005 | Lahiri et al. | 710/113 |
| 6,898,649 B2 | 5/2005 | Goudie | |
| 6,898,678 B1 * | 5/2005 | Six et al. | 711/151 |
| 6,920,632 B2 * | 7/2005 | Donovan et al. | 718/103 |
| 6,970,454 B1 | 11/2005 | Purcell et al. | |
| 6,973,520 B2 | 12/2005 | Drerup et al. | |
| 6,976,106 B2 | 12/2005 | Tomlinson et al. | |
| 6,976,109 B2 | 12/2005 | Shenderovich | |
| 7,000,048 B2 * | 2/2006 | McAlpine et al. | 710/200 |
| 7,013,357 B2 | 3/2006 | Murdock et al. | |
| 7,054,969 B1 | 5/2006 | Phelps et al. | |
| 7,149,829 B2 | 12/2006 | Weber et al. | |
| 7,165,094 B2 | 1/2007 | Weber et al. | |
| 7,194,566 B2 | 3/2007 | Wingard et al. | |
| 7,296,105 B2 | 11/2007 | Weber et al. | |
| 2001/0010066 A1 | 7/2001 | Chin et al. | |
| 2002/0138677 A1 | 9/2002 | Brock et al. | |
| 2002/0169935 A1 | 11/2002 | Rogers et al. | |
| 2003/0074520 A1 | 4/2003 | Weber | |
| 2003/0156597 A1 | 8/2003 | Eberle et al. | |
| 2004/0042481 A1 | 3/2004 | Kurupati | |
| 2004/0210696 A1 | 10/2004 | Meyer et al. | |

FOREIGN PATENT DOCUMENTS

| | | |
|---|---|---|
| EP | 1 091 301 A2 | 4/2001 |
| WO | WO 00/29961 | 5/2000 |

OTHER PUBLICATIONS

Sgroi, M., et al., "Addressing the System-on-a-Chip Interconnect Woes Through Communication-Based Design," University of California at Berkeley, Princeton University, DAC 2001, Jun. 18-22, 2001, Las Vegas, Nevada, (7 pgs).

Telecommunications Protocol and Design by Spragins (ISBN: 0-21-09290-5, Jul. 1992).

Search Report for PCT/US04/010864 mailed Jan. 18, 2005, 7 pgs.

Drew Wingard, Sonics, Inc., "Sonics SOC Integration Architecture", P1500 Presentation, Jan. 28, 1999, pp. 1-25.

Wolf-Dietrich Weber, Sonics, Inc., "Efficient shared DRAM Subsystems for SOC's", Systems on IC's www.sonicsinc.com, Copyright 2001, Sonics, Inc., pp. 1-6.

OCP International Partnership, "Open Core Protocol Specification", Release 1.0 OCP-IP Confidential, Document Revision 1.1.1, Copyright 2001, pp. 184 total.

International Search Report for International Application No. PCT/US2004/029727, mailed on Sep. 9, 2004, pp. 4 total.

OCP International Partnership, "Open Core Protocol Specification", Release 1.0, (189 pages).

Shin, Eung S. et al., "Round-robin Arbiter Design and Generation" ISSS '02, Oct. 2-4, 2002, Kyoto, Japan, 6 pages.

Goossens et al., "Guaranteeing the Quality of Services in Networks on Chip", Philips Research Laboratories, Eindhoven, The Netherlands Technical University of Eindhoven, Eindhoven, The Netherlands, In Axel Jantsch and Hannu Tenhunen, editors, Networks on Chip. Kluwer, Chapter 4, Mar. 2003, pp. 61-82.

Patent Abstracts of Japan, vol. 0090, No. 20 (P-330), Jan. 26, 1985 & JP 59 165118 A (Hitachi Seisakusho KK), Sep. 18, 1984 abstract, pp. 1 total.

Patent Abstracts of Japan, vol. 0183, No. 00 (P-1750), Jun. 8, 1994 & JP 6 060018 A (Fujitsu LTD), Mar. 4, 1994, abstract, pp. 1 total.

K.C. Lee, "A Variable Round-Robin Arbiter for High Speed Buses and Statistical Multiplexers", XP-002309605, IEEE Computers and Communications, 1991, Retrieved from the Internet: URL:http://ieeexplore.ieee.org/ie12/329/3368/00113787.pdf?isNumber-3368&prod=IEEE+CNF&arnumber=113787&arSt=23&ared=29&arAuthor=Lee%2C+K.C.%3B>retrieved on Dec. 8, 2004, pp. 23-29 double-sided document.

* cited by examiner

Table 1: Round Robin Arbitration

| Request (ABC) | Grant (ABC) | Arbitration State |
|---|---|---|
| 1 1 1 | 1 0 0 | ABC |
| 0 1 1 | 0 1 0 | BCA |
| 1 1 1 | 0 0 1 | CAB |
| 1 1 1 | 1 0 0 | ABC |
| 0 1 1 | 0 1 0 | BCA |
| 0 1 1 | 0 0 1 | CAB |
| 1 1 0 | 1 0 0 | ABC |
| 0 1 1 | 0 1 0 | BCA |
| 0 0 1 | 0 0 1 | CAB |
| 1 0 1 | 1 0 0 | ABC |
| 0 0 1 | 0 0 1 | CAB |
| 0 0 0 | 0 0 0 | CAB |

Figure 2a

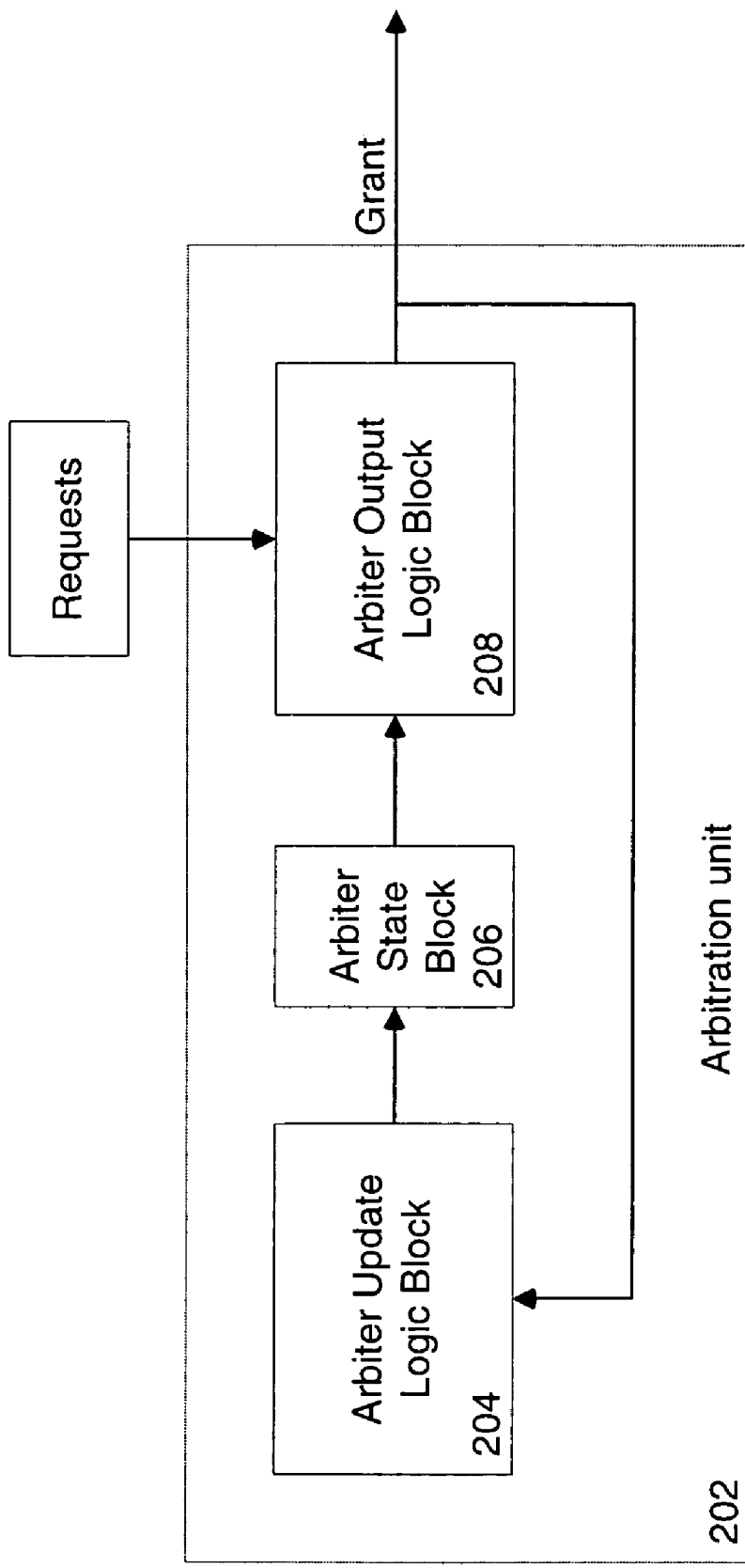
Figure 2b: Arbiter Block Diagram

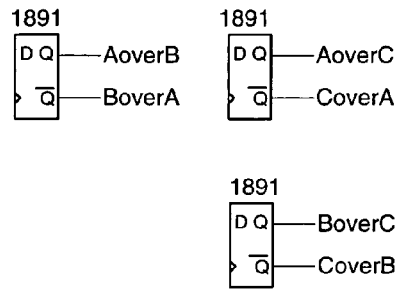
Figure 3b: Round Robin State
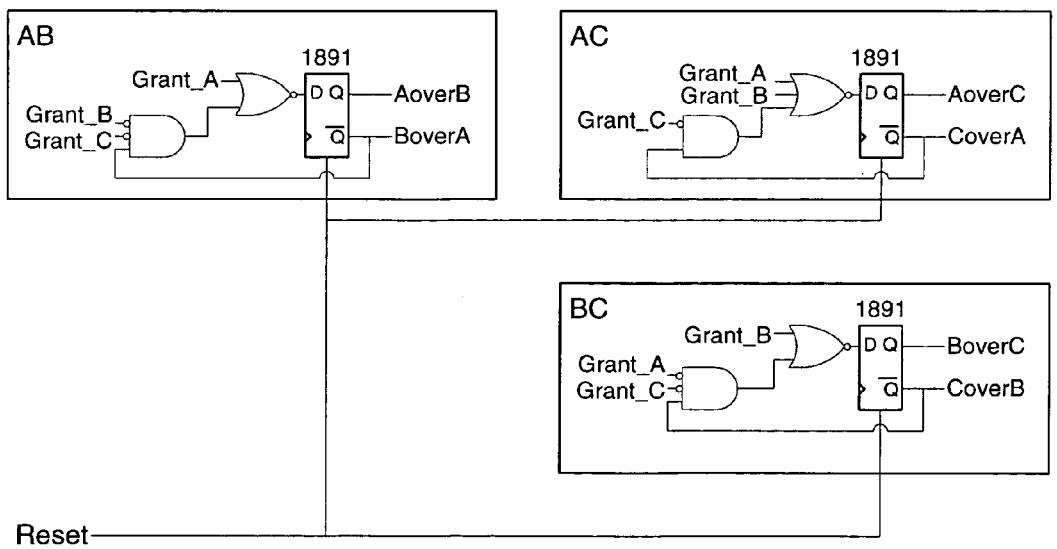
Figure 4a: Round Robin Update Logic and State

405

| Grant (ABC) | Arbitration Next State | AoverB Next State | AoverC Next State | BoverC Next State |
|---|---|---|---|---|
| 1 0 0 | BCA | 0 | 0 | 1 |
| 0 1 0 | CAB | 1 | 0 | 0 |
| 0 0 1 | ABC | 1 | 1 | 1 |
| 0 0 0 | No change | | | |

Figure 4b

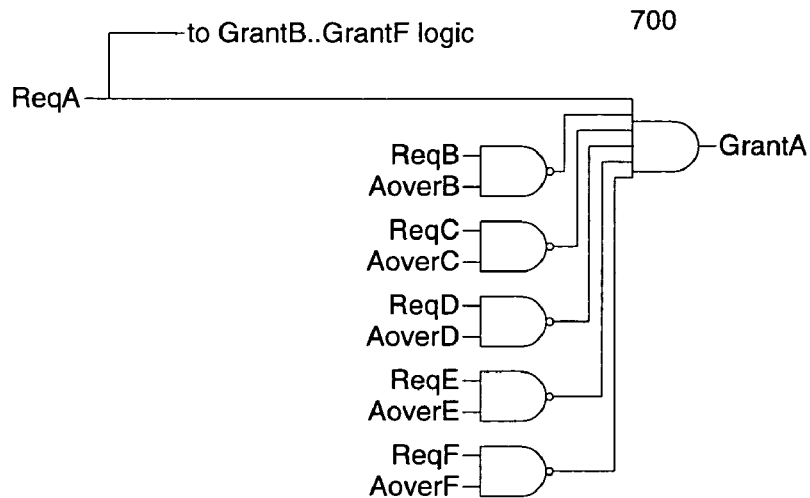
Figure 7: Example 6-device arbiter output logic without fanin/fanout restrictions
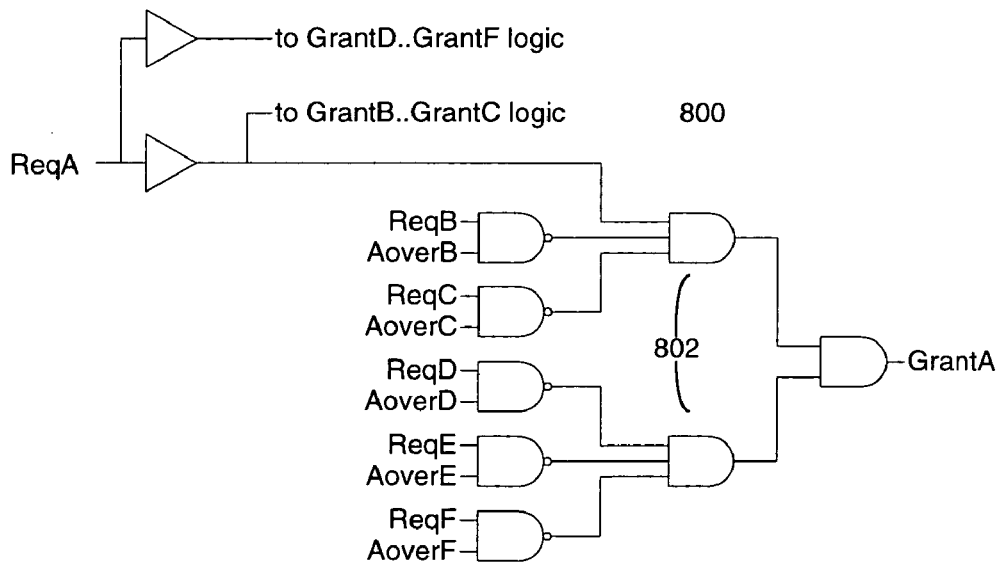
Figure 8: Example 6-device arbiter output logic with fanin/fanout restrictions

METHOD AND APPARATUS FOR ROUND ROBIN RESOURCE ARBITRATION WITH A FAST REQUEST TO GRANT RESPONSE

FIELD OF THE INVENTION

Embodiments of the present invention relate to resource arbitration, and more particularly a round robin arbitration scheme for resource arbitration.

BACKGROUND

When there is a resource that is shared by multiple requestors, one requestor can use the resource in a specific period (typically one clock cycle) it is necessary to have an arbiter that accepts requests and ensures that the one requestor is granted use of the resource. Examples of shared resources include a network, bus, and silicon backplane. Many situations require fair arbitration for a resource, where fair arbitration means that every requestor participating in the arbitration process should win arbitration at least one out of N arbitrations where N is the number of active requesters. In a fair arbitration scheme the worst case request-grant latency is N arbitrations for an N-requestor arbiter.

Round robin arbitration is a commonly used fair arbitration policy because it ensures equal and fair access to a resource. In a round robin arbitration policy the requestors are assigned a fixed order of priority rotation. For example, the order of three requestors could be R1, R2, R3 and back to R1. The requestor that was granted the token last is considered the lowest priority and the requester after it is considered the highest priority. For example, if R2 was the last unit to be granted a request, then R3 would be the highest priority, followed by R1 and finally R3. If R3 requests and is granted the token, then it would become the lowest priority, so the arbitration order would be R1, R2, then R3.

Another form of round robin arbitration uses a ring counter to cycle the priority of each of the requestors by selecting one of N fixed-priority arbiters. Every time a request is granted the ring counter advances by one. This approach is less desirable in many applications than the approach above where the requester is made the lowest priority, because it doesn't distribute the bandwidth as evenly when there are inactive requesters.

One prior art implementation of a combinational logic block arbitration mechanism at least three levels deep to determine a request to grant delay time is illustrated in FIG. 1. In this example, at least three levels of logic gates with accompanying fan out exist to determine the arbitration process between the requesting devices. A first level of AND logic gates feeds input signals to a second level of logic gates which then feeds input signals to a third level of AND logic gates labeled U8A-U8C. The input connections from state registers and request signal inputs, labeled A-F, fan out to the first level of logic gates. The output connections from the first level of logic gates fan in then until an ultimate grant decision can be made by the third level of logic gates labeled U8A-U8C. The timing of the request to grant delay time degrades linearly with number requestors in the ring and the number of levels of logic needed to make a final grant determination.

SUMMARY OF THE INVENTION

A method and apparatus for a fair resource arbitration scheme is described. An arbitration unit that implements a fair round robin policy where each requesting device has an equal chance of accessing a shared resource based upon a rotating request priority assigned to that requesting device, wherein the fast arbitration unit includes a plurality of state registers, one for each possible unordered pair of requesting devices.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2a illustrates an example table of how an embodiment of the round robin arbitration may process amongst three devices A, B, and C.

FIG. 2b illustrates a block diagram of an embodiment of arbitrator to implement a round robin arbitration policy.

FIG. 3B illustrates the state registers for a three requestor arbiter.

FIG. 4a illustrates an embodiment of a state block and an arbiter update logic block.

FIG. 4b illustrates Table 2, which shows an example next state with the device arbiter.

FIG. 7 illustrates a logic diagram of an embodiment of the arbiter output logic for one output of a 6-device arbiter.

FIG. 8 illustrates a logic diagram of an embodiment of how the arbiter output logic splits into multiple AND gates.

DETAILED DESCRIPTION

Figure 1:
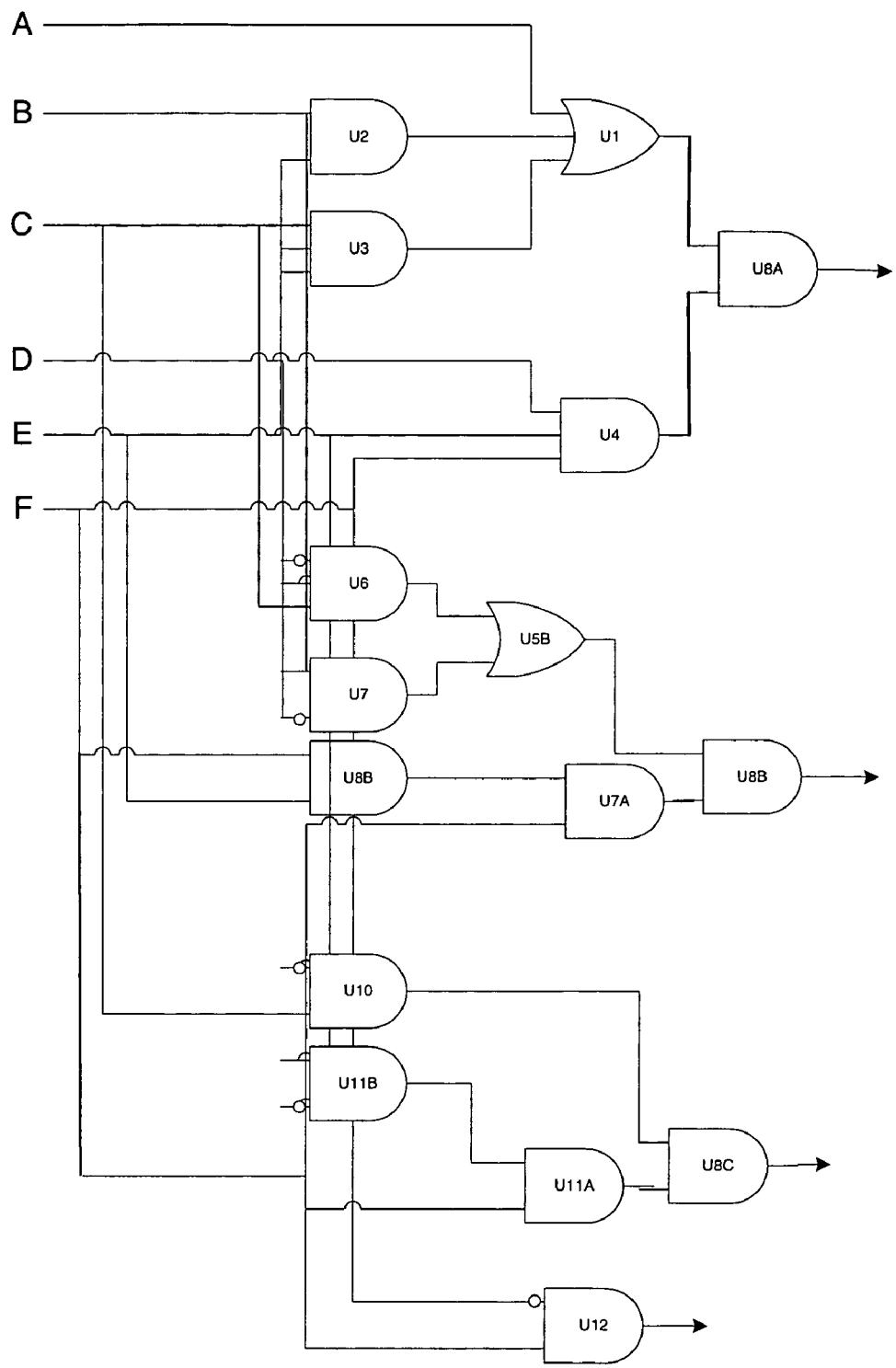
FIG. 1 illustrates a prior art implementation of a combinational logic block arbitration mechanism that is at least three levels deep to determine a request to grant delay time.

In the following description, numerous specific details are set forth, such as examples of specific data signals, named components, connections, number and type of logic circuits making up arbitration logic, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

In general, a method and apparatus for a round robin arbitration is described. Arbitration for a shared resource can be important to the performance of many systems. A round-robin arbiter may be desired so all requesters are guaranteed a uniform share of access to the resource being managed by the arbiter. A fast request to grant may be desired for fast system performance by limiting the combinational logic to two or less levels deep. The combinational logic being two or less levels deep creates a round robin arbitration scheme for resource arbitration with a minimal delay time in the combinational logic to compute the grant output.

FIG. 2a illustrates an example table of how an embodiment of the round robin arbitration may process amongst three devices A, B, and C. Table 1 illustrates how the round robin arbiter changes grants 203 to the highest priority requester 205 based on its current state and updates its state to decrease the priority of the granted device. Note that merely N states are possible in a N-device round robin implementation. The arbitration state 201 describes the order in which the devices are prioritized. ABC means that A will win arbitration if it requests, B will win arbitration only if A isn't requesting, and C will win arbitration only if A and B aren't requesting. In this three device round robin arbitration case, priority orders of ABC, BCA, and CAB are possible (with the last device to win an arbitration being at the end of the list). As the number of devices connected to the arbiter increases, the number of rotations increases linearly (N), but the number of pair-wise state bits increases quadratically (N*(N−1)/2).

FIG. 2b illustrates a block diagram of an embodiment of arbitrator to implement a round robin arbitration policy. The fast arbitration unit 202 implements a fair, not predisposed, arbitration policy where each requesting device has an equal chance (over a some small window of arbitrations) of accessing a shared resource based upon the current request priority assigned to that requesting device. The fast arbitration unit 202 includes three parts, an arbiter update logic block 204, an arbiter state block 206, and an arbiter output logic block 208. The arbiter update logic block 204 updates the request priority of the potential requesting devices. The arbiter state block 206 stores the request priority of each potential requesting device relative to every other requesting device. The arbiter output logic block 208 determines, which request will be granted. This block features a low request to grant logic delay time. All of the devices participating in this arbitration cycle send their request to use the shared resource to the arbiter output logic block 208. A plurality of state registers in the arbiter state block 206 supplies relative request priority information to logic gates in the arbiter output logic block 208.

The fast arbitration unit 202 implementing the arbitration policy attempts to guarantee fairness with no starvation among requesting devices. The fast arbitration unit 202 implementing the round robin arbitration policy chooses all elements in a group equally in some rational order, typically with a rotating priority scheme where each device is the top priority device at some time in the round robin arbitration cycle. The round robin rotation may either be a simple one device rotation of the priority (e.g. advancing from ABC to BCA when any unit wins arbitration or a time slot passes) or it may involve advancing the rotation to the point where the winning device is now the lowest priority (e.g. advancing from ABC to BCA if A wins, but advancing to ABC if C wins). The fast arbitration unit 202 implementing the round robin arbitration policy grants access to the resource to the requesting device 1) with the highest priority and 2) who also sends a request to access the shared resource.

In the arbiter state block 206, a state register may exist for each possible pair of requesting devices. Each state register may store 1) the arbitration servicing information, such as request priority information, for a particular requesting device and 2) how that device's arbitration servicing information compares to another potential requesting device's arbitration servicing information in order to determine which of these two devices has a higher request priority between them. Thus, each state register stores which of the pair of requests will win if both are requesting. The arbiter state block 206 supplies the inputs to the logic gates of the combinational logic block in coordination with the actual requests present during that arbitration cycle to determine which requesting device will be granted the token ownership of the shared resource for an arbitration cycle. The actual request to grant delay time may be improved by moving more of the computational activities to the arbiter state block 206 and arbiter update logic block 204.

Figure 3A:
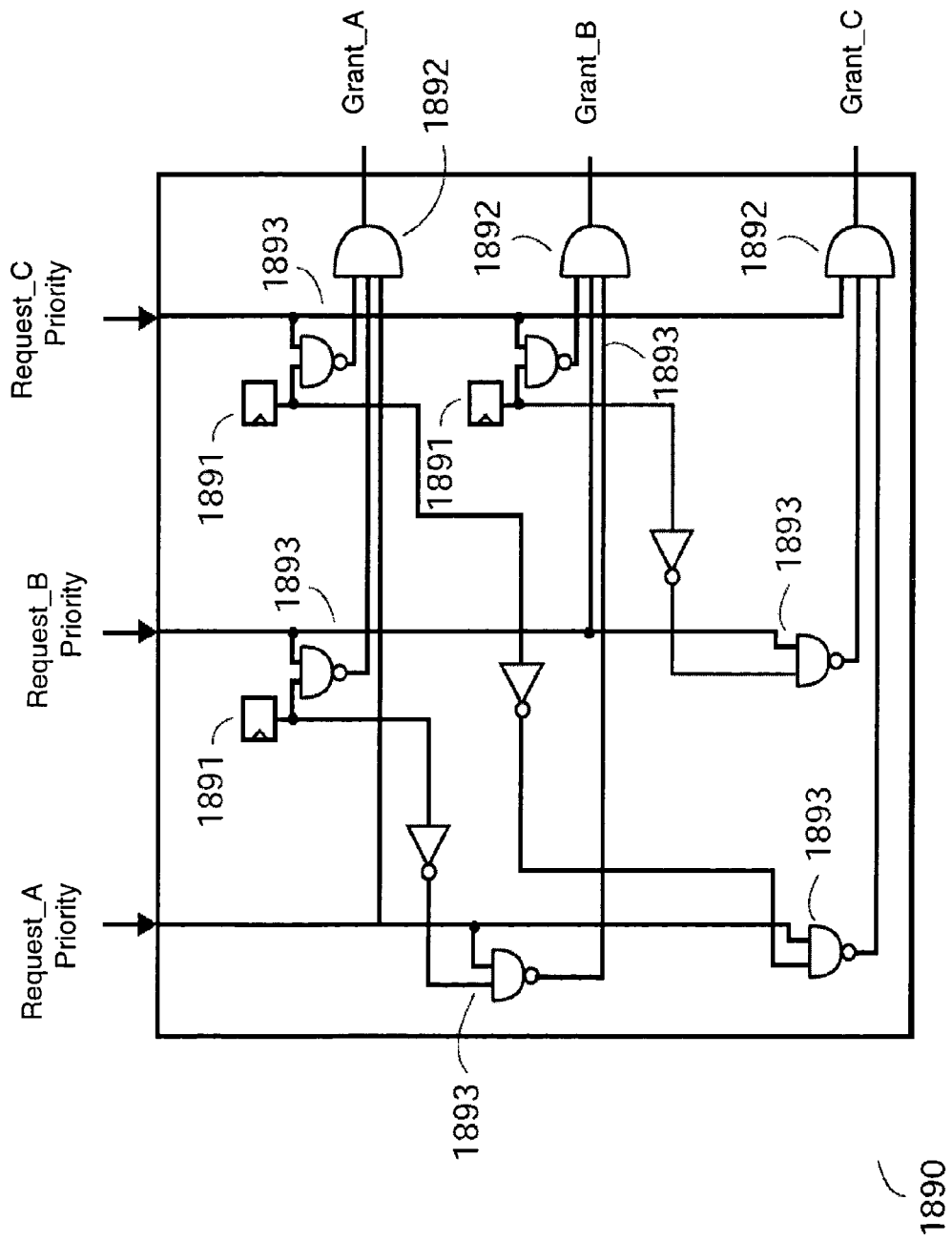
FIG. 3A illustrates a logic diagram of an embodiment of the arbiter state registers and arbiter output logic for a three requestor arbiter.

One state register is needed for any unordered pair of requests rather than an ordered pair of requests because the either the true output or the complement output of the state register describe both ordered pairs. Thus the number of state registers required is N*(N−1)/2 where N is the number of requesting devices. Referring to FIGS. 3a, 3b, and 4a, the state registers 1891 store values that decode the arbitration priorities of devices ABC, BCA, and CAB. AoverB is true if A precedes B in the name (e.g. the state is either ABC, or CAB). AoverC is true if A precedes C (e.g., the priority is ABC). BoverC is true if B precedes C (e.g. the priority is either ABC or BCA). The other request pairs, BoverA, CoverA, and CoverB are the complement of the reversed pairs. Note an ordered pair generally applies to only one instance of that pair with a set order. For example, AB means B always follows A. In an unordered pair, all instances of that pair will be included in the set. For example, AB means B follows A or A follows B.

FIG. 3A illustrates a logic diagram of an embodiment of the arbiter state registers and arbiter output logic. This is a combinational logic structure that is two or less levels deep. The first level is the NAND logic gates and inverting gates that feed inputs to the next level of logic gates. The next level up of logic gates, the AND logic gates makes the grant decision. Each grant signal is computed by 1) a N−1 number of two input NAND gates feeding as well as 2) a request signal feeding an N-input AND gate to provide a very fast request-to-grant delay. The delay of this structure scales very well as the number of requesting devices increases, since merely the fanout of the request signals (increase in logic gates to provide additional signals to the vertically on FIG. 3a) and the fanin of the AND gate increase when another device is added. Two levels of logic make this structure extremely fast relative to some other round robin implementations. As the number of arbitrating devices increases, only the fanout of the request input and the fan-in of the last level increases. As the number of requesting devices increases, buffering may be required on the request inputs and the N-input AND gate may need to be split into multiple gates. FIG. 7 illustrates a logic diagram of an embodiment of the arbiter output logic 700 for one output of a 6-device arbiter. FIG. 8 illustrates a logic diagram of an embodiment of how the arbiter output logic 800 may need to be split into multiple AND gates either because the library doesn't support 6-input AND gates or a 3-input AND gate feeding a 2-input AND gate is faster than a 6-input AND gate. FIG. 8 also shows how buffering by adding additional AND gates 802 may be required to reduce the fanout on the request inputs from 6 to two followed by a fanout of 3.

Each state register may receive an input indicating recent arbitration servicing information for all of the potential requesting devices from the arbiter update logic block 204. The arbiter update logic block 204 supplies an input to update the request priority between each pair of requesting devices for every status register in the arbiter state block even the status registers associated with a pair of potential requesting devices that did not win the arbitration process. FIG. 4a illustrates the logic to compute the updated arbiter state based on rotating the priorities until the granted device is the lowest priority as shown in Table 2.

FIGS. 4a and 4b illustrate the round robin rotation policy. FIG. 4b illustrates Table 2, which shows the next state with the device arbiter. The round robin rotation policy 405 even distributes the unused cycles if one of the requestors is idle. A single device rotation (ABC always advances to BCA, which always advances to CAB). In the single device rotation C gets preference over A in two out of three rotations. In the winner-based rotation the arbiter does not advance to BCA if device B never requests arbitration, so A and C get equal preference. Nonetheless, the single device rotation may have uses since the next state may be solely a function of the current state and depend on the request inputs. The single device rotation form of the round robin arbitration can also be implemented by changing the arbiter update logic block.

This logic structure can be generalized and applied to resources where there are more than three example requesting devices shown in the figures. In this case additional inputs, requesting pair state registers, arbiter update logic, and arbiter output logic may be required, but it all follows the pattern seen in the example three device arbiter. The number of state registers required for a N-requestor arbiter is $N*(N-1)/2$. FIG. 3a shows an example three state registers because one state register exists for each possible pair of requesting devices ($3*(3-1)/2$). A four requestor arbiter would require $4*(4-1)/2$ or 6 state registers, while an eight requestor arbiter would require $8*(8-1)/2$ or 28 state registers.

A reliable prediction of the worst-case wait time is another advantage of the round-robin protocol. The worst-case wait time is proportional to number of requestors minus one.

Figure 5:
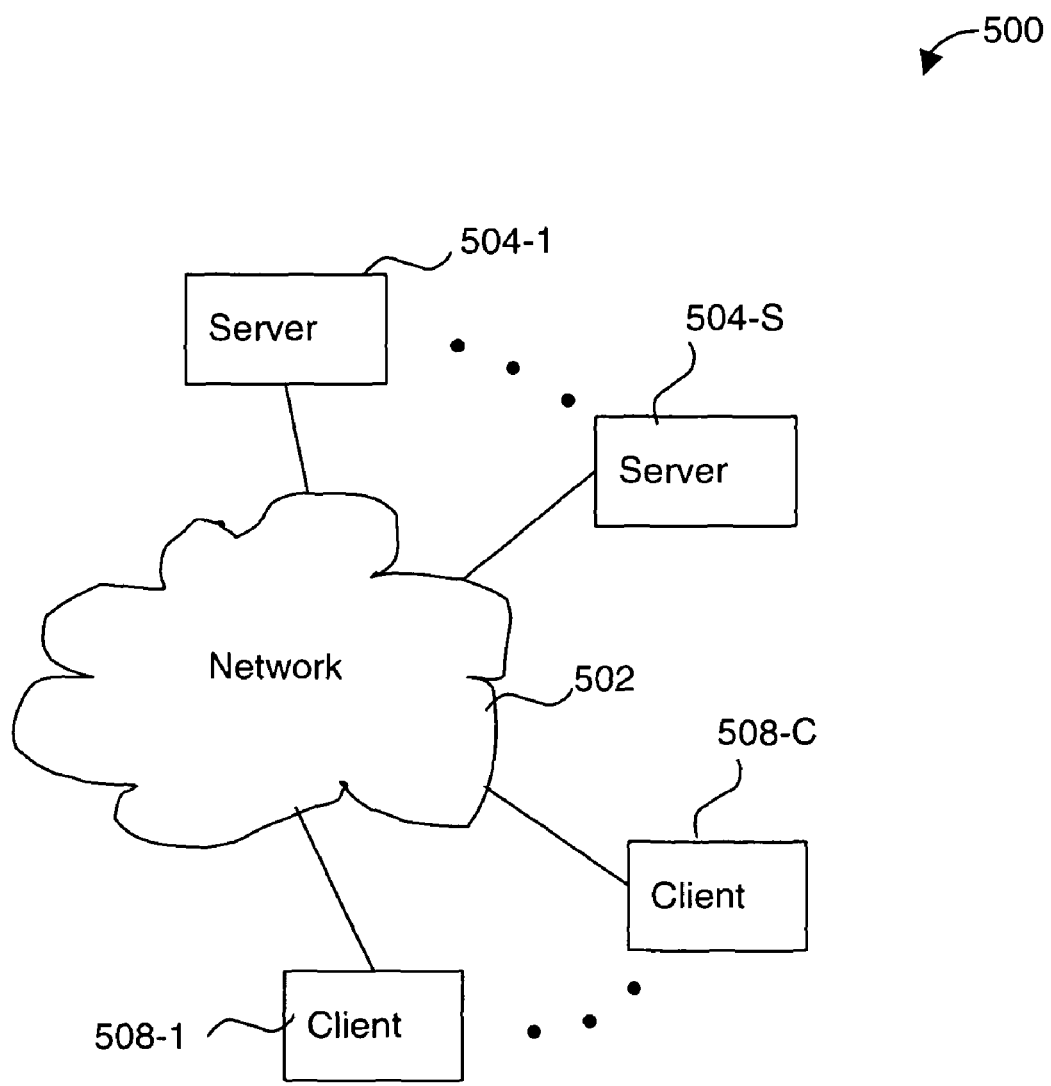
FIG. 5 illustrates a block diagram of an embodiment of a network environment in which the method and apparatus of the present invention may be implemented.

FIG. 5 illustrates a block diagram of an embodiment of a network environment in which the method and apparatus of the present invention may be implemented. The network environment 500 has a network 502 that connects S servers 504-1 through 504-S, and C clients 508-1 through 508-C. FIG. 5 illustrates a network environment 500 in which the arbitration techniques described may be applied. The network environment 500 has a network 502 that connects S servers 504-1 through 504-S, and C clients 508-1 through 508-C. As shown, several systems in the form of S servers 504-1 through 504-S and C clients 508-1 through 508-C are connected to each other via a network 502, which may be, for example, an on-chip communication network. Note that alternatively the network 502 might be or include one or more of: inter-chip communications, an optical network, the Internet, a Local Area Network (LAN), Wide Area Network (WAN), satellite link, fiber network, cable network, or a combination of these and/or others. The servers may represent, for example: a master device on a chip; a memory; an intellectual property core, such as a microprocessor, communications interface, etc.; a disk storage system; and/or computing resources. Likewise, the clients may have computing, storage, and viewing capabilities. The method and apparatus described herein may be applied to essentially any type of communicating means or device whether local or remote, such as a LAN, a WAN, a system bus, on-chip bus, etc. It is to be further appreciated that the use of the term client and server is for clarity in specifying who initiates a communication (the client) and who responds (the server). No hierarchy is implied unless explicitly stated. Both functions may be in a single communicating device, in which case the client-server and server-client relationship may be viewed as peer-to-peer. Thus, if two devices such as 508-1 and 504-S can both initiate and respond to communications, their communication may be viewed as peer-to-peer. Likewise, communications between 504-1 and 504-S, and 508-1 and 508-C may be viewed as peer to peer if each such communicating device is capable of initiation and response to communication.

Figure 6:
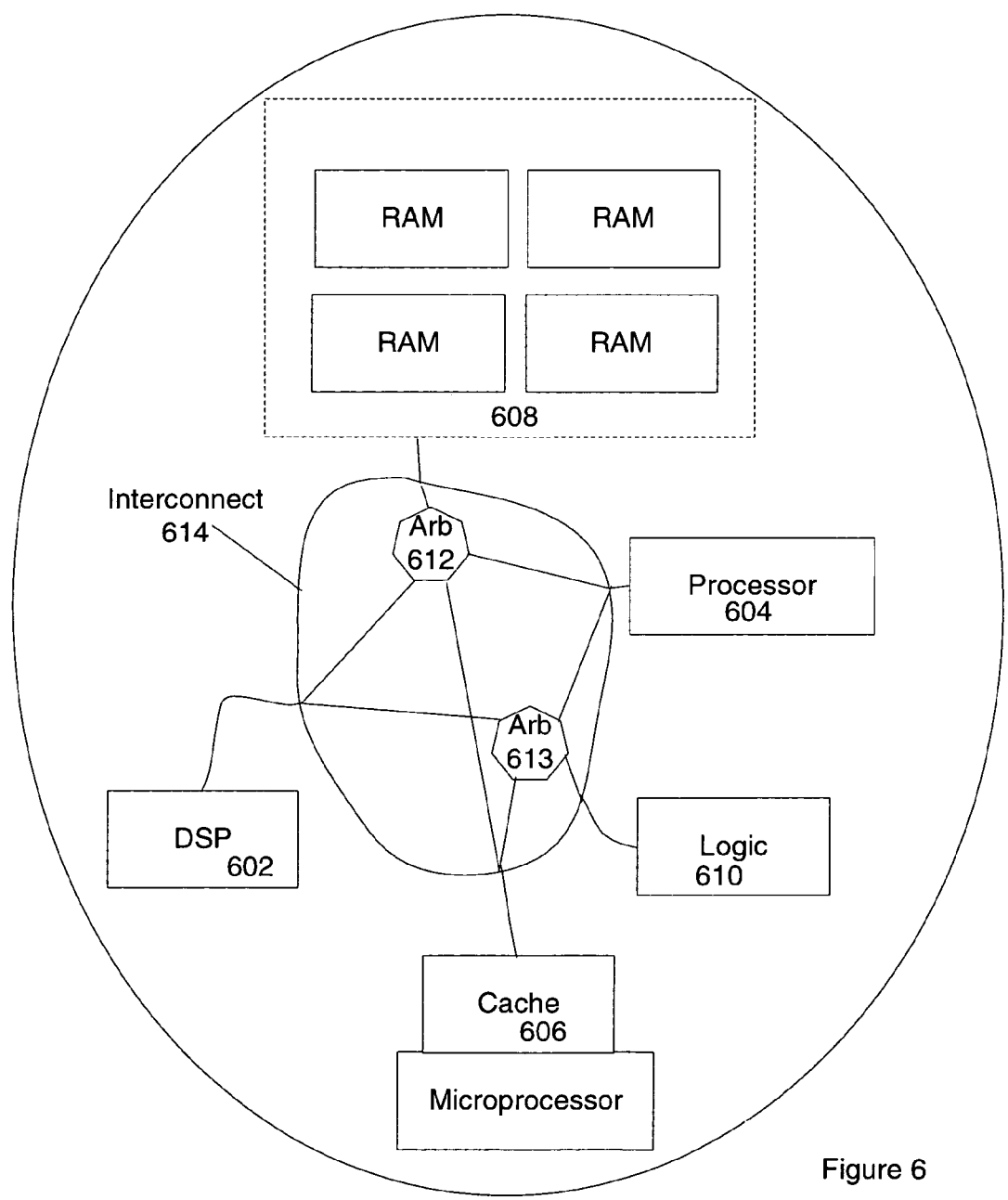
FIG. 6 illustrates a block diagram of an embodiment of an arbitration unit implementing the arbitration policy amongst multiple blocks of functionality.

FIG. 6 illustrates a block diagram of an embodiment of an arbitration unit implementing the arbitration policy amongst multiple blocks of functionality. Multiple arbitration units 612-613 may connect to various blocks of functionality 602-606 to arbitrate requests for access to shared resources 608-610 respectively (or there may be a single arbitration unit to arbitrate requests to the interconnect 614). The blocks of functionality 602-610 may include Intellectual Property cores (IP) such as circuitry, buses, communication links, a microprocessor, etc., having self-contained designed functionality. Additionally, IP may be implemented in a variety of ways, and may be fabricated on a single integrated circuit such as a system on a chip.

In addition, the fast arbitration unit may be employed in other implementations such as memory scheduling.

In an embodiment, a machine-readable medium may have stored thereon information representing the apparatuses and/or methods described herein. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. Slower mediums could be cached to a faster, more practical, medium. The information representing the apparatuses and/or methods stored on the machine-readable medium may be used in the process of creating the apparatuses and/or methods described herein. For example, the information representing the apparatuses and/or methods may be contained in an Instance, soft instructions in an intellectual property (IP) generator, or similar machine-readable medium storing this information. Thus, the information representing the apparatuses and/or methods stored on the machine-readable medium may be used in the process of creating the apparatuses and/or methods described herein.

The IP generator may be used for making highly configurable, scalable System On a Chip inter-block communication system that integrally manages data, control, debug and test flows, as well as other applications. In an embodiment, an example intellectual property generator may comprise the following: a graphic user interface; a common set of processing elements; and a library of files containing design elements such as circuits, control logic, and cell arrays that define the intellectual property generator.

In the foregoing specification, the invention has been described with reference to specific exemplary embodiments thereof. It will, however, be evident that various modifications and changes may be made thereto without departing from the broader spirit and scope of the invention as set forth in the appended claims. For example, in one embodiment, the arbitration policy may be implemented in hardware with logic gates. In another embodiment, the arbitration policy may be implemented in software. The specification and drawings are, accordingly, to be regarded in an illustrative rather than a restrictive sense.

What is claimed is:

1. An apparatus, comprising:
   an arbitration unit for a shared bi-directional communication bus that implements a round robin policy where each requesting device, of a plurality of requesting devices, has an equal chance of accessing the shared bi-directional communication bus based upon a current request priority assigned to that requesting device, wherein the arbitration unit includes at least a state block that includes a plurality of state registers, each of the state registers is to store information that indicates which requesting device of a respective pair of the plurality of requesting devices will win if both devices of the respective pair are requesting access to the shared resource;

an update logic block configured to track a current request priority of each of the respective pairs of requesting devices relative to the other pairs that could request access to the shared bi-directional communication bus, and wherein the update logic block and the state block act to pre-compute an ordered list in which the requesting devices from the plurality of requesting devices are prioritized to win the arbitration process if a given requesting device was to present a request to the arbitration unit on an initial arbitration cycle; and an arbiter output logic of the arbitration unit, wherein the arbiter output logic is composed of logic gates that are two levels or less deep to determine a request to grant time and the two levels of logic are increased by logic to buffer the request inputs to reduce request fanout, or by splitting the final output gate to reduce fanin, and a time period from the initial arbitration cycle to the grant time is less than or equal to two clock cycles in the apparatus.

2. The apparatus of claim 1, wherein a first state register of the plurality of state registers stores how one requesting device's request priority information compares to another requesting device's request priority information in order to determine which of these two devices has a higher request priority between them.

3. The apparatus of claim 1, wherein the round robin arbitration policy in the update logic updates the current request priority between the respective pair of requesting devices for every state register in the state block during an arbitration cycle.

4. The apparatus of claim 1, wherein the number of state registers is equal to N(N−1)/2 where N equals the number of the plurality of requesting devices.

5. A machine-readable medium having instructions stored thereon, which when executed by the machine cause the machine to generate a representation of the apparatus of claim 1.

6. The apparatus of claim 1, wherein the plurality of state registers, include a first state register for a first unordered pair of requesting devices, a second state register for a second unordered pair of requesting devices, and a third state register for a third unordered pair of requesting devices.

7. An arbiter for a system-on-a-chip (SOC) implementing a shared bi-directional communication bus, comprising:

an arbitration unit that implements a round robin policy where each requesting device, of a plurality of requesting devices, has an equal chance of accessing the shared communication bus based upon a current request priority assigned to that requesting device, wherein the arbitration unit includes at least a combinational logic block composed of logic gates that are limited to a first and a second levels deep, the first level of logic gates to receive as input a plurality of signals each indicating how the priority of one of the requesting devices compares to that of another, the plurality of signals covering all possible combinations of pairs of said plurality of requesting devices, and the second level of logic gates receives as input a request signal for each requesting device and makes the final determination on which requesting device won an arbitration process and thereby gains ownership of a token to access a shared resource, and wherein the first level of logic gates acts to pre-compute an ordered list, in which the requesting devices from all of the possible combinations of pairs of requesting devices are prioritized relative to each other, to win the arbitration process if a given requesting device from that ordered list was to present a request to the arbitration unit on an initial arbitration cycle, and a time period from the initial arbitration cycle to a grant time is two clock cycles in the SOC.

8. The SOC of claim 7, wherein the arbitration unit further comprises:

a logic block that includes a plurality of state registers, one for each pair of requesting devices from the plurality of requesting devices, wherein the plurality of state registers provided the plurality input signals to the first level of logic gates.

9. The SOC of claim 8, wherein the update logic block also is configured to supply one or more inputs to the plurality of state registers, indicating recent arbitration servicing information for the plurality of requesting devices.

10. A machine-readable medium having instructions stored thereon, which when executed by the machine cause the machine to generate a representation of the SOC of claim 9.

11. A system-on-a-chip (SOC), comprising:

a plurality of Intellectual Property cores;

a shared bi-directional communication bus accessed by the plurality of Intellectual Property cores;

an arbitration unit to arbitrate access of the shared communication bus, the arbitration logic unit comprising logic configured to implement a round robin arbitration policy, and having a state block that includes a plurality of state registers, each state register to indicate which device, of a respective pair of requesting devices, has a higher request priority over the other, wherein the round robin arbitration policy updates the request priority for the respective pair of requesting devices for every state register in the state block during a single arbitration cycle, an update logic block configured to track a current request priority of each of the respective pairs of requesting devices relative to the other pairs that could request access to the shared bi-directional communication bus, and wherein the update logic block and the state block act to pre-compute an ordered list in which the requesting devices from the plurality of requesting devices are prioritized to win the arbitration process if a given requesting device was to present a request to the arbitration unit on an initial arbitration cycle, and a combinational logic block composed of logic gates that are two levels or less deep to determine a request to grant time, and a time period from an initial arbitration cycle to a grant time is less than or equal to two clock cycles in the SoC.

12. The system-on-a-chip of claim 11, wherein the update logic block also is configured to supply one or more inputs to the plurality of state registers, indicating recent arbitration servicing information for all requesting devices that can request access to the shared resource.

13. A machine-readable medium having instructions stored thereon, which when executed by the machine cause the machine to generate a representation of the apparatus of claim 12.

14. The system-on-a-chip of claim 11, wherein the arbitration unit further comprises logic to buffer request inputs to reduce request fanout.

15. The system-on-a-chip of claim 11, wherein the arbitration unit further comprises circuitry that increases the two levels of logic by splitting a final output gate to reduce fanin.

* * * * *